United States Patent Office 3,232,837
Patented Feb. 1, 1966

3,232,837
HEPARIN DERIVATIVES AND METHODS OF PREPARING SAME
Gerard Nomine, Noisy-le-Sec, and Robert Bucourt, Villiers-le-Bel, France, assignors to Roussel-UCLAF, a corporation of France
No Drawing. Filed June 19, 1961, Ser. No. 117,815
Claims priority, application France, June 21, 1960, 830,651; July 8, 1960, 832,449; Oct. 10, 1960, 840,757
15 Claims. (Cl. 167—74)

This invention relates to heparinamides and N-lower alkyl heparinamides whose carboxy groups are 60 to 95% amidified, and the alkali metal salts thereof. The invention also relates to novel processes for the preparation of said heparinamides.

The heparinamides and their alkali metal salts, and particularly N-methyl heparinamides, possess a higher antilipemic activity with practically no anti-coagulant activity than other members of the heparin family.

It is an object of the invention to provide novel heparinamides whose carboxy groups are 60 to 95% amidified and the alkali metal salts thereof.

It is another object of the invention to provide novel processes to prepare heparinamides which are 60 to 95% amidified and the alkali metal salts thereof.

It is a further object of the invention to provide novel intermediates for the preparation of the heparinamides of the invention.

It is an additional object of the invention to provide novel antilipemic compositions comprising heparinamides which are 60 to 95% amidified.

These and other objects and advantages of the invention will become obvious from the following detailed description.

The compounds of the invention are heparinamides and N-lower alkyl heparinamides and the alkali metal salts thereof, whose carboxy groups are 60 to 95% amidified. The degree of amidification depends upon the nature of the amine and on the concentration of the amine.

One process for preparing the heparinamides of the invention comprises forming a long chain quaternary ammonium salt of heparin, reacting the latter with a lower alkyl esterification agent to form the lower alkyl ester of heparin, reacting said ester with a compound selected from the group consisting of ammonia and a primary lower alkyl amine to form the corresponding heparinamide and recovering said heparinamide.

The desired heparinamide may be recovered by forming a quaternary ammonium salt thereof, transforming said salt into the alkali metal salt of said heparinamide, precipitating the said alkali metal salt by the addition of an organic solvent and filtering, washing and drying said salt.

In the execution of the process according to the invention, we use high-molecular weight quaternary ammonium salts capable of producing water-insoluble salts with heparin by double decomposition, such as the preferred benzyldimethyl-2-[2-(p - 1,1,3,3 - tetramethylbutyl - phenoxy)-ethoxy]-ethyl ammonium chloride having the empirical formula $C_{27}H_{42}ClNO_2 \cdot H_2O$ and the structural formula

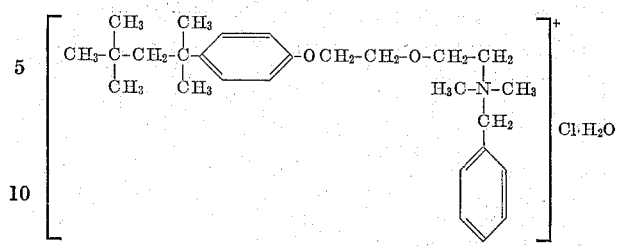

hereinafter referred to by its commercial name "Hyamine 1622." Other high-molecular weight quaternary ammonium salts may be used in place of "Hyamine 1622." Other such high-molecular weight quaternary ammonium salts are "Hyamine 2389" described in the "Index of Modern Sulfonated Oils and Detergents" (vol. II), by J. P. Sisley, page 373, as being the chloride of a quaternary ammonium base, "Cequartyl BE" mentioned on page 287 of the Index as being "based on ammonium salts," "Arquad 2C" which according to the same Index on page 261 is said to be dilauryl dimethyl ammonium chloride and "Zephirol" which according to the same Index on page 286 is said to be alkyl dimethyl benzyl ammonium chloride.

The esterification agents can be any of the usual esterification agents producing lower alkyl esters, but diazomethane is preferred for producing the methyl ester of heparin.

The amidification reaction can be effected in aqueoeus or anhydrous media which may be formed by a solvent such as formamide. It is preferred to use an aqueous media when ammonia is the amidification agent. Examples of suitable primary lower alkyl amines are methylamine, ethylamine, propylamine, isopropylamine, butylamine, isobutylamine, tertiary butylamine, etc. The amidification is usually conducted at low temperatures, preferably −30° to +25° C.

In the preparation of N-methyl heparinamide by this process, a variant of the process is to first produce heparinamide by this process, form a long chain quaternary ammonium salt of heparinamide and then methylate the amide group with diazomethane to form N-methyl heparinamide.

A second method for preparing the heparinamides of the invention comprises forming a long chain quaternary ammonium salt of heparin, reacting said salt with a lower alkyl chloroformate, preferably ethyl chloroformate, to form a mixed anhydride, reacting said anhydride with ammonia or a primary lower alkyl amine to form the desired heparinamide.

The amidification reaction can be conducted in an anhydrous media, but it gives very good results while operating in the presence of a small amount of water.

The second process leads to products whose antilipemic activity is as high as that of the products obtained by the preceding process, but whose anticoagulant activity is reduced about half in comparison with the said products.

The heparinamides of the invention may be used by oral methods or parental injection, either in the form of intramuscular, intraveinous injections, or by a rectal method. They can be made in the form of aqueous injectable solutions, prepared in ampoules and in multidose flacons, in the form of tablets, and suppositories.

The usual dosage is controlled between 50 and 200 milligrams per dose per day when administered by intramuscular method and between 100 and 400 milligrams per dose per day by oral methods.

In the following examples there are described several preferred embodiments to illustrate the invention. However, it should be understood that the invention is not intended to be limited to the specific embodiments.

EXAMPLE I.—PREPARATION OF THE POTASSIUM SALT OF HEPARINAMIDE

*Step A: The potassium salt of methyl ester of heparin*

(a) *Preparation of the Hyamine salt of heparin acid.*—40 gm. of sodium heparinate, 7.2% solvated, were dissolved in 160 cc. of water and 10 cc. of formic acid were added. Then 810 cc. of a 10% solution of Hyamine 1622 were added.

The reaction mixture was agitated for several minutes. The precipitated product was vacuum filtered, washed with water and dried in order to recover 86.8 gm. (being 91.4%) of the Hyamine 1622 salt of heparin acid.

(b) *Esterification with diazomethane.*—30 gm. of the Hyamine 1622 salt of heparin acid were dissolved in 300 cc. of methylene chloride. The solution was cooled to 0° C. and 51 cc. of a methylene dichloride solution containing 14.7 gm. of diazomethane for every 100 cc. were slowly introduced. The reaction mixture was allowed to stand for a period of ten minutes at 0° C. and then the solvent was distilled under vacuum. The residue was dissolved in 450 cc. of butanol saturated with water and the butanolic solution was extracted with a 20% solution of potassium acetate. The extracts were poured into ethanol and this latter mixture was allowed to stand one hour. The product obtained was vacuum filtered, washed with ethanol and with ether and 12.86 gm. of the potassium salt of the methyl ester of heparin were recovered.

The product was 4.4% solvated. It occurred in the form of a white solid, insoluble in the usual organic solvents such as alcohol, ether, acetone, benzene, chloroform, and soluble in water and dilute aqueous alkalis. It was decomposed in dilute aqueous acids and had a specific rotation $[\alpha]_D^{20} = +45°$ (c.=1% in water).

*Analysis.*— $C_{52}H_{73}O_{73}N_4S_{11}K_{11}$, molecular weight = 2,705. Calculated: C, 23.08%; H, 2.72%; N, 2.07%; $OCH_3$, 4.6%. Found: C, 22.8–22.9%; H, 3.0–2.7%; N, 1.9%; $OCH_3$, 4.4.

This product is not described in the literature.

In a similar manner, the sodium salt of the methyl ester of heparin was prepared, utilizing a sodium acetate solution in the place of the potassium acetate solution to extract the butanolic solution containing the Hyamine 1622 salt.

*Step B: Amidification*

800 cc. of a 22° Bé. ammoniacal solution were saturated with ammonia gas at +3° C. A solution of 8 grams of the potassium salt of the methyl ester of heparin in 40 cc. of distilled water was added under agitation at +3° C. The reaction mixture was saturated again with ammonia, then allowed to stand for a period of 48 hours at 0° C. The ammonia was removed by distillation under vacuum at temperatures below 20° C.

To the residual aqueous solution, a solution of 16 grams of Hyamine 1622, in 160 cc. of distilled water was added. The Hyamine 1622 salt precipitated. The salt was vacuum filtered and washed with water, then it was dissolved in butanol saturated with water. The butanolic solution was extracted with a 20% aqueous solution of potassium acetate. The extracts were combined, poured into ethanol and the substance which precipitated was vacuum filtered and dried over phosphoric anhydride. 7.08 grams of the potassium salt of heparin-amide were obtained having an amidification value of about 72% and having the following characteristics: solvation: 7.75%—ester functions: 0.

*Analysis.*—$C_{46}H_{69}O_{69}S_{11}N_8K_{11}$, molecular weight = 2,645. Calculated: C, 21.79%; H, 2.62%; N, 4.23%; S, 13.33%. Found: C, 22.0–22.1%; H, 2.6%; N, 3.5–3.6%; S, 12.3.

Physiological activity:
   Antilipemic: 116 u./mg., being corrected to 136 u./mg.
   Anticoagulant: 25 u./mg., being corrected to 30 u./mg.

This product is not described in the literature.

In a similar manner, the sodium salt of heparinamide was prepared utilizing a sodium acetate solution in place of the potassium acetate solution to extract the butanolic solution containing the Hyamine 1622 salt.

EXAMPLE II.—PREPARATION OF THE SODIUM SALT OF N-METHYL HEPARINAMIDE IN AN ANHYDROUS MEDIA 30 cc. of monomethylamine were condensed at −30 and −40° C. A solution cooled to 0° C. of 0.5 gram of the sodium salt of methyl ester of heparin and 15 cc. of formamide were added. The reaction mixture was maintained at a temperature between −10 and −15° C. for a period of two hours. The excess of methylamine was removed under vacuum and a solution of 15 grams of Hyamine 1622 in 100 cc. of water was added. After allowing the reaction mixture to stand overnight, the Hyamine 1622 salt was vacuum filtered. The salt was introduced into 20 cc. of butanol saturated with water. The butanolic solution was extracted with a 20% aqueous solution sodium actate. The extracts were combined, poured into alcohol, and the precipitated sodium salt of N-methylheparinamide was vauuum filtered. This product was washed with alcohol and dried by phosphoric anhydride. A yield of 458 mg. (being 88%) was obtained and the product was 13.1% solvated.

Antilipemic activity: 151 u./mg.
Anticoagulant activity: 11 u./mg. (corrected values)
Amount of nitrogen: 3.8% (theoretical being 4.41%), From the percentage of nitrogen, the amount of amidification is 71.5%.

This product is not described in the literature.

In a similar manner, the potassium salt of N-methyl heparinamide was prepared utilizing a potassium acetate solution in place of the sodium acetate solution for extraction of the butanolic solution containing the Hyamine 1622 salt.

EXAMPLE III.—PREPARATION OF THE SODIUM SALT OF N-METHYL HEPARINAMIDE IN AQUEOUS MEDIA

Monomethylamine was bubbled into 25 cc. of water while maintaining the temperature between 0 and +5° C. until a volume of 50 cc. was attained. 0.5 gram of the sodium salt of the methyl ester of heparin was added, and the mixture formed was agitated for two hours at +10° C.

The methylamine was removed under vacuum. A solution of 1.5 grams of Hyamine 1622 in 100 cc. of water was added to the aqueous reaction mixture, and the reaction mixture was allowed to stand at room temperature overnight. The precipitate was vacuum filtered and dissolved in 20 cc. of butanol saturated with water, and the butanolic solution was extracted with a solution of sodium acetate. The extracts were combined and poured into alcohol. The precipitated sodium salt of N-methylheparinamide was vacuum filtered and dried over phosphoric anhydride. The yield was 478 mg. of solvated product (being 95.5%) containing 9.95% solvatation and had a specific rotation $[\alpha]_D^{20} = +50.7°$ (c.=1% in water).

Antilipemic activity: 148 u./mg.
Anticoagulant activity: 10.5 u./mg. (corrected values)

*Analysis.* — $C_{52}H_{77}O_{69}S_{11}N_8Na_{11}$; molecular weight = 2,524. Amount of sulfur: 13.03% (theoretical: 13.97%). Amount of nitrogen: 4.1%.

From the percentage of nitrogen, the amidification value is 85%.

EXAMPLE IV.—PREPARATION OF THE POTASSIUM SALT OF N-METHYL HEPARINAMIDE BY METHYLATION OF THE HEPARINAMIDE 2 grams of the sodium salt of heparinamide, obtained according to Example I, were dissolved in 10 cc. of water. 2 cc. of formic acid, then 34 cc. of a 10% solution of Hyamine 1622 were added. The Hyamine salt which precipitated was vacuum filtered and washed with water. After drying over phosphoric anhydride, it was dissolved in 50 cc. of methylene chloride. 10 cc. of a solution containing 11 grams of diazomethane per liter were introduced. The reaction mixture was allowed to stand for a period of several minutes and then concentrated under vacuum. The residue was taken up in 75 cc. of butanol saturated with water and extracted with a 20% aqueous solution of potassium acetate. The extracts were combined and poured into alcohol. The precipitated potassium salt of N-methyl heparinamide was vacuum filtered, washed and dried, in order to recover 1.7 grams of a 7.1% solvated product and containing 0.05% of potassium acetate.

Percentage of nitrogen: 3.5–3.6% (corrected, theoretical 4.23%)
Antilipemic activity: 125 units per milligram
Anticoagulant activity: 8.9 units per milligram (corrected values).

The percentage of nitrogen confirms that the amount of amidification of the starting product of 72% remained constant in the product obtained.

In a similar manner, the sodium salt of N-methyl heparinamide was prepared utilizing a solution of sodium acetate in place of the potassium acetate solution for extraction of the butanolic solution containing the Hyamine 1622 salt.

EXAMPLE V.—PREPARATION OF N-METHYL HEPARINAMIDE 2.0 cc. of ethyl chloroformate were added to a solution of 6 grams of the neutral Hyamine 1622 salt of heparin prepared according to the method described in the commonly assigned, copending application Serial No. 783,139, filed December 29, 1958, now U.S. Patent No. 2,989,438, in 120 cc. of tetrahydrofuran, said solution being cooled to 0 to +2° C. and containing 0.3% water. The mixture was agitated for 15 minutes at 0 to +2° C. and then monomethylamine was bubbled therethrough in such a fashion as to introduce 4 liters of gas in a period of 15 minutes while refrigerating below +7° C. The reaction mixture was agitated for a further period of 45 minutes at 0 to +2° C. Thereafter, it was distilled to dryness under vacuum at room temperature. The residue was dissolved in 80 cc. of butanol saturated with water. Four successive extractions were made with 6 cc. of a 20% aqueous solution of sodium acetate. The extracts were combined and treated with 43 cc. of a 10% solution of "Hyamine 1622." After remaining at rest an hour, the solution was vacuum filtered, washed with water, and the residue taken up with 60 cc. butanol saturated with water. Three extractions were made with 6 cc. of a 20% solution of sodium acetate each time.

The product, N-methyl heparinamide, was white, insoluble in alcohol and ether, soluble in water and dilute aqueous acids or alkalis and had a specific rotation $[\alpha]_D^{20} = +55$ to $58°$ C. (c.=1% in water).

Amidification value: 90%
Solvatation: 7.7%
Sulfur: 13.75% (theoretical being 13.98%)
Antilipemic activity: 179 units per milligram
Anticoagulant activity: 4.1 units per milligram.

EXAMPLE VI.—PREPARATION OF 10% INJECTABLE SOLUTION

The sodium salt of N-methyl heparinamide was dissolved in distilled water and the pH of the solution was adjusted to 6.8. 0.3% of m-cresol was added as preservative and the volume was adjusted to the desired concentration. After filtration the solution was divided into ampoules of 1 cc. which were sterilized by heating to 60° C. for a period of one-half hour. It is obviously possible to prepare injectable solutions of concentrations between 5 and 20 parts per 100 parts of solution according to this procedure.

Therapeutic application (1) *In vivo activity on the dog in post-prandial hyperlipemia, after injection by veinous methods.*—The compound was injected by intravenous method 5 hours after oral administration of 10 gm. per kilogram of fresh cream. At this moment, the hyperlipemia and the plasmatic turbidity which result from administration of the fresh cream were at the maximum and showed a flattening for a period of one hour in the non-treated animal. The table below shows the activity of doses of 25 and 50 gammas per kilogram in percent of diminution of turbidity with reference to turbidity at the moment of injection of the sodium salt of N-methyl heparinamide.

| Doses | Time After Injection | | | |
|---|---|---|---|---|
| | 5 min. | 10 min. | 20 min. | 30 min. |
| 25 gammas per kilogram percent | 70 | 70 | 24 | 18 |
| 50 gammas per kilogram percent | 80 | 84 | 77 | 75 |

(2) *In vivo activity on dogs with post-prandial hyperlipemia after administration by oral methods.*—The experimental steps in order to obtain hyperlipemia are the same as preceding.

The sodium salt of N-methyl heparinamide was administered orally five hours after the cream when the hyperlipemia and the plasmatic turbidity were maximum. The plasmatic turbidity was measured immediately after ingestion of the compound, then 30 minutes, one hour and two hours after. The percentage of diminution of plasmatic turbidity was determined with reference to the value obtained at the fifth hour.

The percentages of diminution obtained after administration of 5 milligrams per kilogram of sodium salt of N-methyl heparinamide, as well as the percentage of increase observed in a non-treated control are summarized in the following table:

| Dose | Times After Oral Administration | | |
|---|---|---|---|
| | 30 min. | 1 hour | 2 hour |
| Non-treated percent | 110 | 160 | 200 |
| 5 milligrams per kilogram do | 46 | 46 | 60 |

(3) *Clarifying action on the normal rabbit.*—The study was made by determination of the clarifying action on the plasma of the normal rabbit having received an injection of the sodium salt of N-methyl heparinamide.

The determination on the plasma taken before the injection and at variable times after the injection was made by incubation at 37° C. in the presence of "Ediol" (Schenlabs) (homogenous and stable emulsion of coconut oil). The determination was made on 0.8 cc. of citrated plasma +0.2 cc. of "Ediol" diluted to 1/100 part. The clarifying power was measured by diminution of turbidity of the mixture after injection. The sodium salt of N-methyl heparinamide was injected in a dose of 1 and 2 milligrams per kilogram.

| Doses Intravenously | Clarification in Percent of Initial Turbidity | | | | |
|---|---|---|---|---|---|
| | 5 min. | 15 min. | 30 min. | 45 min. | 60 min. incubation at 37° |
| Control | 5 | 5 | 2 | 4 | 2 |
| 1 mg./kg. 15 minutes after injection | 6.5 | 6.5 | 6 | 6.5 | 8 |
| 1 mg./kg., 30 minutes after injection | 8 | 8 | Slight increase of turbidity | | |
| Control (before injection) | 3 | 2.5 | 7 | 6 | 5 |
| 2 mg./kg., 15 minutes after injection | 5 | 9 | 15 | 22.5 | 33 |
| 2 mg./kg., 30 minutes after injection | 8 | 17 | 28 | 37 | |

*Determination of acute toxicity*

The test was made on mice of the Rockland strain weighing between 18 and 22 grams. The sodium salt of N-methyl heparinamide was used in solution in physiologic serum in the concentration of 50 milligrams per cc. The pH of the solution was 7.3. The solution was injected by subcutaneous method in doses of 100 and 200 milligrams per kilogram in lots of 10 mice per dosage level. The animals were placed under observation for a period of a week after injection.

One death was noted in a group of 10 control mice not having received the medicine and one death in a group of mice having received 200 milligrams per kilogram. Neither mortality nor sign of intoxication was noted in the other animals. The dose of 100 milligrams per kilogram is thus well tolerated and the death of one mouse at a dose of 200 milligrams per kilogram can very well be divorced from the toxicity of the product.

Various modifications of the processes and compositions of the invention may be made without departing from the spirit or scope thereof and it is to be understood that the invention be limited only as defined in the appended claims.

We claim:

1. Heparinamide selected from the group consisting of heparinamide and the alkali metal salts thereof, N-lower alkyl heparinamide and the alkali metal salts thereof, said heparinamide having 60 to 95% of their carboxy group amidified.

2. Heparinamide having 60 to 95% of its carboxy groups amidified.

3. N-methyl heparinamide having 60 to 95% of its carboxy groups amidified.

4. The lower alkyl ester of heparin wherein the carboxylic acid groups are esterified.

5. The methyl ester of heparin wherein the carboxylic acid groups are esterified.

6. The mixed acid anhydride formed by the reaction of a lower alkyl chloroformate and a long chain, high molecular weight, quaternary ammonium salt of heparin.

7. A process for the preparation of heparinamide selected from the group consisting of heparinamide and the alkali metal salts thereof, N-lower alkyl heparinamide and the alkali metal salts thereof, said heparinamide having 60 to 95% of their carboxy groups amidified which comprises reacting heparin with a long chain, high molecular weight quaternary ammonium compound to form the corresponding quaternary ammonium salt of heparin, reacting the latter with a lower alkyl esterification agent to form a lower alkyl ester of heparin, reacting said ester with a member selected from the group consisting of ammonia and a primary lower alkyl amine to form the corresponding heparinamide and recovering said heparinamide.

8. The process of claim 7 wherein the esterification agent is diazomethane.

9. The process of claim 7 wherein the lower alkyl ester of heparin is reacted with ammonia to form heparinamide.

10. The process of claim 7 wherein the lower alkyl ester of heparin is reacted with methylamine to form N-methyl heparinamide.

11. A process for the preparation of N-methyl heparinamide whose carboxy groups are 60 to 95% amidified which comprises reacting heparin with a long chain, high molecular weight quaternary ammonium compound to form the corresponding quaternary ammonium salt of heparin, reacting the said salt with an esterification agent to form a lower alkyl ester of heparin, reacting the ester with ammonia to form heparinamide whose carboxy groups are 60 to 95% amidified, reacting the latter with a long chain, high molecular weight quaternary ammonium compound to form the corresponding quaternary ammonium salt of said heparinamide, reacting said salt with diazomethane to form N-methyl heparinamide whose carboxy groups are 60 to 95% amidified and recovering the latter.

12. A process for the preparation of heparinamide selected from the group consisting of heparinamide and the alkali metal salts thereof, N-lower alkyl heparinamide and the alkali metal salts thereof, said heparinamide having 60 to 95% of their carboxy groups amidified, which comprises reacting heparin with a long chain, high molecular weight quaternary ammonium compound to form the corresponding quaternary ammonium salt of heparin, reacting said salt with a lower alkyl chloroformate to form a mixed anhydride, reacting said anhydride with a member selected from the group consisting of ammonia and lower alkyl amines to form the corresponding heparinamide and recovering the latter.

13. The process of claim 12 wherein the lower alkyl chloroformate is ethyl chloroformate.

14. The process of claim 12 wherein the mixed anhydride is reacted with methylamine to form N-methyl heparinamide.

15. The process of claim 14 wherein the reaction of the mixed anhydride and methylamine is effected in tetrahydrofuran in the presence of a small amount of water.

References Cited by the Examiner

UNITED STATES PATENTS

| 2,881,161 | 4/1959 | Kohler et al. | 260—211 |
| 2,954,321 | 9/1960 | Coleman | 167—74 |
| 2,989,438 | 6/1961 | Nomine et al. | 260—211 |

OTHER REFERENCES

Kent, Biochemistry of the Aminosugars, Academic Press Inc., New York, N.Y., 1955, pages 90–92.

Scott et al., Trans. Roy. Soc. Canada, 3rd Ser., May 1942, pages 49–51.

Springer, Polysaccharides in Biology, Madison Printing Co., Madison, N.J., 1959, pages 127 and 128.

JULIAN S. LEVITT, *Primary Examiner.*

A. L. MONACELL, FRANK CACCIAPAGLIA, Jr., *Examiners.*